United States Patent
Aaron et al.

(10) Patent No.: US 6,237,241 B1
(45) Date of Patent: May 29, 2001

(54) SUSPENDED OBJECT CABLE-SUSPENSION ORIENTING SYSTEM

(75) Inventors: Kim Maynard Aaron, La Crescenta; Kerry T. Nock, Duarte, both of CA (US)

(73) Assignee: Global Aerospace Corporation, Pasadena, CA (US)

( * ) Notice: Subject to any disclaimer, the term of this patent is extended or adjusted under 35 U.S.C. 154(b) by 0 days.

(21) Appl. No.: 09/167,316

(22) Filed: Oct. 6, 1998

(51) Int. Cl.$^7$ .................................................. G01D 21/00
(52) U.S. Cl. ................................................. 33/613; 33/268
(58) Field of Search .............................. 33/613, 1 E, 227, 33/228, 268, 391, 392, 506, 645, 568, 569, 573; 73/170.01

(56) References Cited

U.S. PATENT DOCUMENTS

| | | | | |
|---|---|---|---|---|
| 2,599,381 | * | 6/1952 | Gerks | ...................................... 33/268 |
| 4,575,942 | * | 3/1986 | Moriyama | ............................... 33/568 |

* cited by examiner

Primary Examiner—Christopher W. Fulton
(74) Attorney, Agent, or Firm—Pillsbury Winthrop LLP

(57) ABSTRACT

An orienting device controls two tilt degrees of freedom of one or more suspended objects by raising supporting cables on one or two sides of the objects while lowering the cables on the opposite sides. Two separately controlled sets of tilt cables adjust two independent tilt degrees of freedom. An example is a stack of solar panels hanging below the gondola of a scientific balloon. The panels are automatically pointed in the same direction by the parallelogram-like arrangement of the cables. By manipulation of the cables, the stack of panels can be pointed in essentially any direction despite rotation of the gondola about the vertical axis in a way that eliminates any twisting of cables or need for slip rings. Additional cables deploy the stack of panels as well as restow them very compactly and securely inside the protective base of the gondola. These deployment/retraction cables are arranged to manipulate the tilt cables to prevent tangling or snagging during restowing. Since the "structure" holding the panels includes cables rather than rigid cantilevered material, this support is very lightweight, a key ingredient for balloon systems. This orienting system could be used to point other such as telescopes, radio dishes, and mirrors.

35 Claims, 10 Drawing Sheets

SUSPENDED OBJECT CABLE-SUSPENSION ORIENTING SYSTEM

BACKGROUND OF THE INVENTION

1. Field of the Invention

The present invention relates generally to the orienting of objects and more specifically to the orienting of arrays of solar panels, suspended by cables from a balloon gondola.

2. Description of the Related Art

Many devices are designed to control two tilt degrees of freedom (dofs) to properly orient an object. Some orienting devices directly pivot the object using rotary actuators while others use two linear actuators in conjunction with some kind of pivot point. Many include a stabilizing mechanism to prevent rotation about a third axis.

One example of an orientation control device is used in security cameras. Some security cameras control two rotations directly. Such a camera may have a tip-tilt mechanism to aim the camera up and down with the tip-tilt mechanism mounted on a pan arrangement that allows the camera to be aimed left and right. In this construction, the camera cannot rotate about its optical axis (i.e., the line of sight) so that the top of the camera always corresponds to the top of the image. Thus, two dofs are controlled while the third rotational dof is constrained. Such an orienting device may be referred to as an azimuth/elevation mechanism since azimuth and elevation angles are controlled independently.

Due to the inherent constraint on the third degree of freedom, use of an azimuth/elevation mechanism to orient an object toward a target may hinder the intended operation and cause the designer to add a third (possibly unnecessary) actuator or other compensating mechanism. For example, when an azimuth/elevation device is mounted on a vehicle, the azimuthal control may require several revolutions about the azimuthal axis, which is usually vertical, if the vehicle makes several turns. Likewise, if the vehicle is stationary and the target moves around the vehicle, the azimuthal control may also require multiple revolutions. In these situations, any cables running from the vehicle to the device will become twisted. To avoid this, the designer may choose to use slip rings for electrical connections or some kind of rotary joint for fluid lines. However these design compromises may be unnecessary if the device does not require this constraint on the third degree of freedom.

Many devices exist for which rotation about the third axis (i.e., the line of sight) is not important and need not be constrained. For example, a flat solar panel aimed directly at the sun will still generate the same amount of power even if the panel is rotated about the line from the sun to the panel. Similarly, a flat mirror can be rotated about the axis perpendicular to its surface while the reflection remains undistorted in the plane of the mirror. Under these conditions, it is necessary only to control the two tilt dofs while the third dof need not be constrained. Even so, objects such as solar panels and mirrors are often mounted on azimuth/elevation mechanisms, presumably because these mechanisms are readily available.

For example, solar panels are sometimes included in some scientific balloon payloads. Predictably, the balloon and its gondola will tend to rotate slowly about the vertical due to small air currents. The solar panels should be pointed directly towards the sun. However, if an azimuth/elevation mechanism is used, then as the gondola slowly rotates, the cables connecting the solar panel to the balloon will become twisted. As discussed above, various compromises can be used to deal with this situation. Although slip rings may be incorporated to allow the continuous rotation, these are susceptible to dirt, which can cause unreliable electrical contact. Some other means of preventing the rotation of the entire payload (i.e., gondola) may be added, such as a reaction wheel. Alternatively, the cable can be unwound occasionally by reversing the azimuthal drive. However, this operational complexity requires monitoring the number of accumulated revolutions. Also, target-lock cannot be maintained during this procedure.

Orienting a telescope suspended from a balloon leads to similar difficulties. Unlike a security camera, telescope rotation about an optical axis is not of significant concern. Although there may be some advantage to having the same edge of a target, such as a star, at the top of the image, any benefits can be traded off against the mechanical complexity associated with this constraint.

Likewise, a radar dish needs to be aimed in two directions, but rotation about the line of sight is usually unimportant. This device performs the same regardless of roll about the direction of transmission.

Orienting arrangements that avoid azimuth/elevation mechanism constraints have also been developed. For example, a tip/tilt mechanism such as the security camera tip tilt mechanism described above can alternately control two angular dofs by using two linear dof actuators to push or pull at the edges of the device being oriented. As an example, a type of mirror mount used with laser optics in laboratories is in FIG. 16. From FIG. 16, two micrometers or thumb-screws push against two corners of the mount while a third corner is held against a ball bearing acting as a pivot. Retention springs are used to maintain contact at these three points. A mirror fastened to such a mount can be aimed up/down and left/right. For these devices, the angular range of motion may be just a few degrees, but the concept can be extended to a much greater angular range.

Another example of orientation control is the swash plate of a helicopter main rotor. This device transfers the collective and cyclic controls from the pilot's control yoke across the rotating boundary to the moving main rotor. Such a swash plate arrangement includes two push rods with ball and socket end joints to tilt the swash plate about a central pivot and converts two linear dofs into two tilt dofs by means of a pivot bearing or hinge.

An even simpler example is a common venetian blind. A venetian blind controls tilt about a single axis by shortening and lengthening support cables. This device also maintains the general parallelism of many suspended articles (i.e., the blinds) by the parallelogram-like arrangement of the supporting cables. Further, the stack of suspended articles are stowed and extended by using cables to raise and lower the articles in the suspended stack. A venetian blind also uses the weight of the suspended articles to draw the supporting cables out through their guides during deployment and correspondingly to draw the cables back during retraction.

Ineffective mechanisms for deployment and retraction have limited the effective re-use of components in some relevant applications regarding the orienting of solar panels. For example, some scientific balloon systems use solar panels to provide power, where the panels are usually mounted in a configuration prior to launch. Often, due to the need to minimize weight, the panels are somewhat flimsy and delicate. Typically, there are two panels, one extending from side of the gondola. While these panels survive launch, there is usually no attempt to protect them during cut-down and landing; they are thus considered "disposable." During cutdown, the balloon tether is severed and a parachute is used to control the descent of the gondola. The opening shock when the parachute inflates can be as high as ten gravities. Similarly, there is significant deceleration when the gondola lands. Despite energy-absorbing material on its bottom and edges, the gondola experiences significant shock loading on impact. Without an effective deployment and retraction system for the panels, suitable protection to guarantee re-use appears unlikely.

SUMMARY OF THE INVENTION

Accordingly, it is an object of this invention to provide an orienting system that controls two angular degrees of freedom while eliminating continuous rotation with respect to the mounting location.

It is a further object of the current invention to provide an orienting system that simultaneously controls the orientations of several objects that are intended to remain essentially parallel to one another.

It is a further object of the current invention to provide an orienting system that is lightweight, has low power requirements, and is suitable for deployment with a balloon gondola.

It is a further object of the current invention to provide an orienting system that will deploy and compactly stow a stack of solar panels below a balloon gondola so as to protect the stowed panels from damage during the significant accelerations associated with cut-down and landing.

The above and related objects of the present invention are realized by an orienting system that includes a frame, at least one object to be oriented, and tilt cables. The tilt cables connect the objects to one another and to the frame and operate to change the orientation of the objects in two rotational degrees of freedom.

An advantage of such an orienting system is that continuous rotation of the objects with respect to the frame is eliminated even though the pointing direction of the objects can rotate arbitrarily. The system can point several objects in substantially the same direction using a total of just two actuators and can stow thin panels compactly. The system is structurally efficient, using cables in tension rather than struts in bending. The system is therefore lightweight, an important consideration for balloon systems, and it naturally protects the fragile solar panels by encasing them compactly within rigid structure.

Another advantage is that no physical pivot is required. The weight of the deployed objects provides a restoring force. Coupled with the cables, the system acts as a torsional pendulum, maintaining the overall alignment between the suspended objects and the mounting surface.

In accordance with one aspect of the invention, the system also may include a winching system for operating the tilt cables to change the orientation of the objects. Such a winching system allows for more flexible adjustment and control of the orientation of the objects.

In accordance with another aspect of the invention, the objects may include at least one solar panel, telescope, antenna, or reflector. Because these objects are often oriented without regard to rotations about the line of sight, they are especially appropriate for use with the present invention. When the objects include a solar panel, the panel be connected to the winching system by an electrically conducting wire. The winching system may provide additional electrical connections to an external receiver.

In accordance with another aspect of the invention, deployment/retraction cables may be added for extending or reducing the distances between the objects and between the objects and the frame. An additional winching system may be employed to operate the deployment/retraction cables. A protective structure may be added to enclose the objects in a stowed configuration. When deployed as part of a balloon system, the orienting system then will deploy and compactly stow a stack of objects such as solar panels below a balloon gondola and protect the objects from damage during the significant accelerations during cut-down and landing.

In another embodiment of the present invention, an orienting system includes a frame, at least one object to be oriented, and links for changing the orientations of the objects. The links connect the objects to one another and to the frame and operate to change the orientations of the objects in two rotational degrees of freedom. The system may include an articulation system for operating the links to change the orientation of the objects. By using possibly rigid links instead of cables to orient the objects, greater operational flexibility can be achieved in some settings where deployment and retraction are not critical functions.

In accordance with one aspect of the invention, at least one object may include a solar panel. The panel may be connected to the articulation system by an electrically conducting wire. A substantially transparent structure may enclose and protect the objects.

These and other objects and advantages of all of the aspects of the present invention will become apparent to those skilled in the art after having read the following detailed disclosure of the preferred embodiments illustrated in the following drawings.

DETAILED DESCRIPTION OF THE INVENTION

Figure 1:
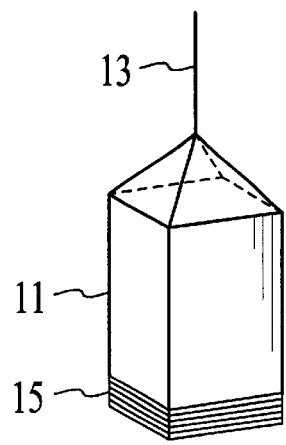
FIG. 1 illustrates in perspective a first preferred embodiment with solar panels stowed compactly in the bottom of a balloon system gondola.

A preferred embodiment of the present invention is illustrated in perspective in FIG. 1. A schematic representation of a gondola 11 is shown hanging by a payload suspension tether 13 from a balloon (not shown). A stack of solar panels 15 is stowed at the base of the gondola and compactly latched into place in a configuration that is suitable for launch and for landing of the gondola. The panels are depicted as square, although other shapes can be used.

Figure 2:
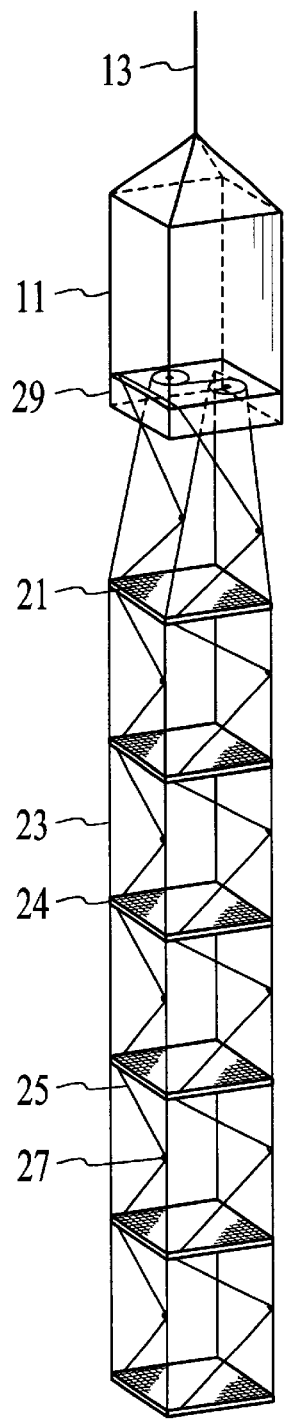
FIG. 2 illustrates in perspective the first preferred embodiment with solar panels deployed below the balloon system gondola.

FIG. 2 shows the preferred embodiment with the solar panels 21 deployed. Tilt-cables 23 are firmly attached to the corners of the solar panels 21 at attachment points 24. The tilt cables 23 support the panels 21 in the deployed state below the gondola and maintain them essentially parallel to one another. Deployment/retraction cables 25 are loosely supported by pulleys 27 at points along the tilt cables 23 essentially midway between panels 21. Only two of the deployment/retraction cables 25 are shown for clarity. Four such deployment/retraction cables 25 are used, one on each side of the solar panels 21. Each of the four deployment/retraction cables 25 is continuous from the lowest panel through guide holes (not shown) in each of the panels and extends upward to a cable management winching system 27 in the gondola 11.

Figure 3:
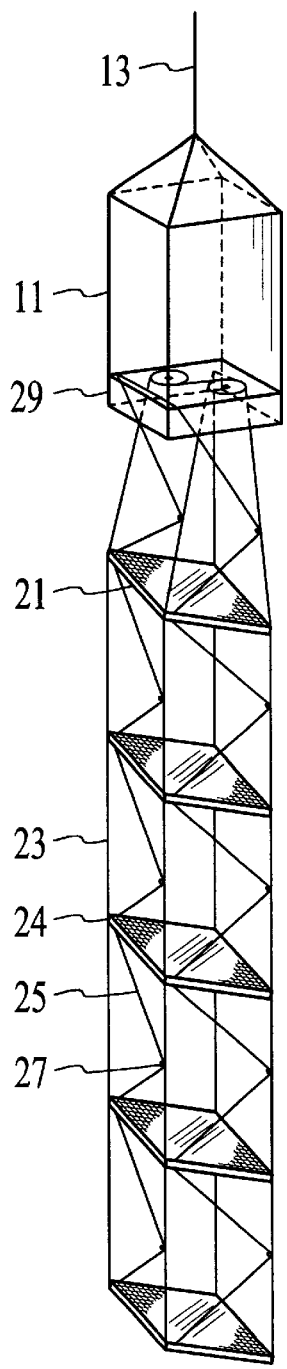
FIG. 3 illustrates in perspective the first preferred embodiment of the suspended tip/tilt mechanism orienting the parallel stack of solar panels below the balloon system gondola.

FIG. 3 depicts the preferred embodiment with the solar panels 21 tilted. The cable management winching system 29 causes the tilt cables to raise and lower opposite corners of the solar panels 21 enabling them to be aimed or oriented in a desired direction, for example toward the sun. Again, only two of the deployment/retraction cables are shown. In this embodiment, the tilt cable 23 on one corner is continuous through the cable management winching system 29 and goes to the opposite corner. Thus, as one corner of the panels 21 is lifted, the opposite corner is automatically lowered, leaving the center of mass of the panels essentially unmoved. Since the center of mass does not move up or down significantly during this tilting movement, the power required can be quite small. For the case shown, electrical power can be transferred from the solar panels 21 to the gondola 11 by an additional use of the tilt cables 23 to include an electrically conducting wire. The cable management winching system 29 will be described in more detail with reference to FIGS. 9 and 10 below.

Figure 4:
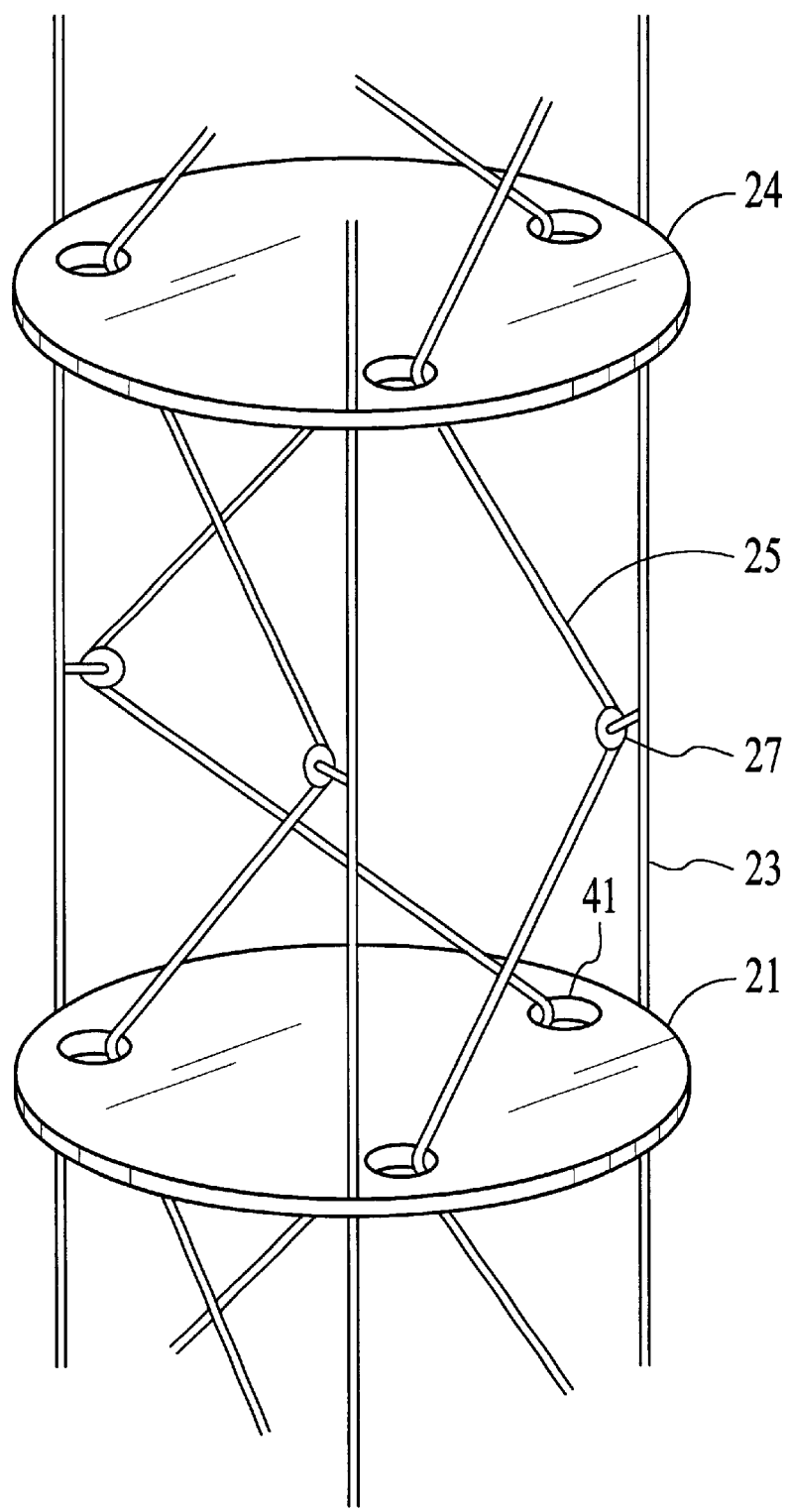
FIG. 4 illustrates in perspective some details of the deployment/retraction cable management system with three sets of cables.

FIG. 4 shows a perspective view of a second embodiment using three tilt cables 23 and three deployment/retraction cables 25. The panels 21 are shown as circular, but again other shapes can be used. A rounded guide hole 41 through the panels 21 is lined with a low friction material, such as Teflon, and acts to guide the deployment/retraction cables 25. A pulley 27 is shown attached to the tilt cables 23 midway between panels for controlling and handling the tilt cables 23 during stowing of the panels 21. In this figure, the panels are shown untilted in a horizontal orientation. With only three tilt cables 23, one cable can be fixed while the other two can be controlled up and down to achieve a wide range of orientations of the panels 21.

Figure 5:
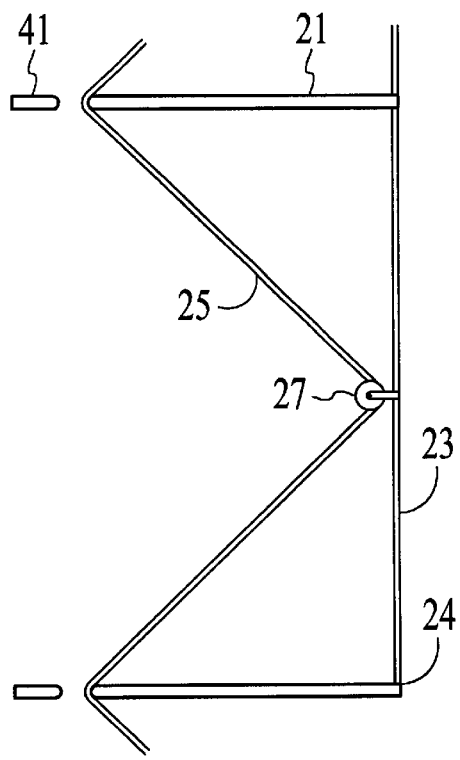
FIG. 5 illustrates in cross-section two fully deployed panels, one tilt cable and one deployment/retraction cable.
Figure 6:
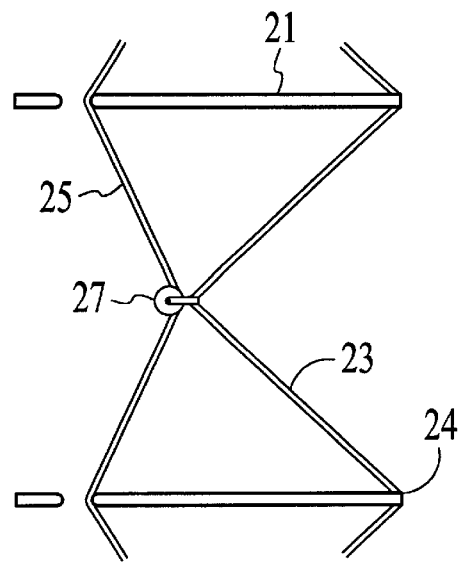
FIG. 6 illustrates in cross-section, the beginning of the retraction process.
Figure 7:
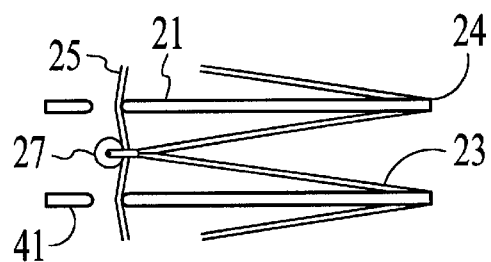
FIG. 7 illustrates in cross-section, the phase approaching full retraction.
Figure 8:
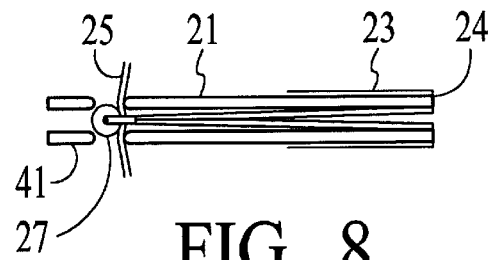
FIG. 8 illustrates in cross-section the fully retracted, or stowed, position.

FIGS. 5, 6, 7, and 8 show a side view section through two adjacent panels 21 of the second embodiment (i.e., FIG. 4) along with the details of one of the tilt cables 23 and one of the deployment/retraction cables 25. Similar structural detail applies to the first embodiment (i.e., FIGS. 1–3). FIG. 5 shows the fully deployed configuration. FIG. 8 shows the fully stowed configuration. FIGS. 6 and 7 show intermediate stages. The guide hole 41 is shown as a smoothly rounded hole through the panel 21, designed to reduce chafing of the cables; alternatively, a pulley could be used.

A pulley 27 is attached to the tilt cables 23 midway between panels 21. This sequence shows how the tilt cables 23 can be kept taut and under control so they do not snag during stowing of the assembly. By coating the cables with a low friction material, it is possible to eliminate the pulley 27 and simply pass the deployment/retraction cable 25 around the tilt cable 23; this alternative design will still perform the function of controlling the position of the tilt cable 23 during stowing. The guide hole 41 is oversized to accommodate the pulley 27 in the final stowed configuration illustrated in FIG. 8. If stowed volume is not critical, then the panels 21 need not come so close together in the final stowed configuration. Bumpers may optionally be added to the top or bottom surfaces of the panels 21 to support them one on the other when stowed and to protect them from shock loads.

Figure 9:
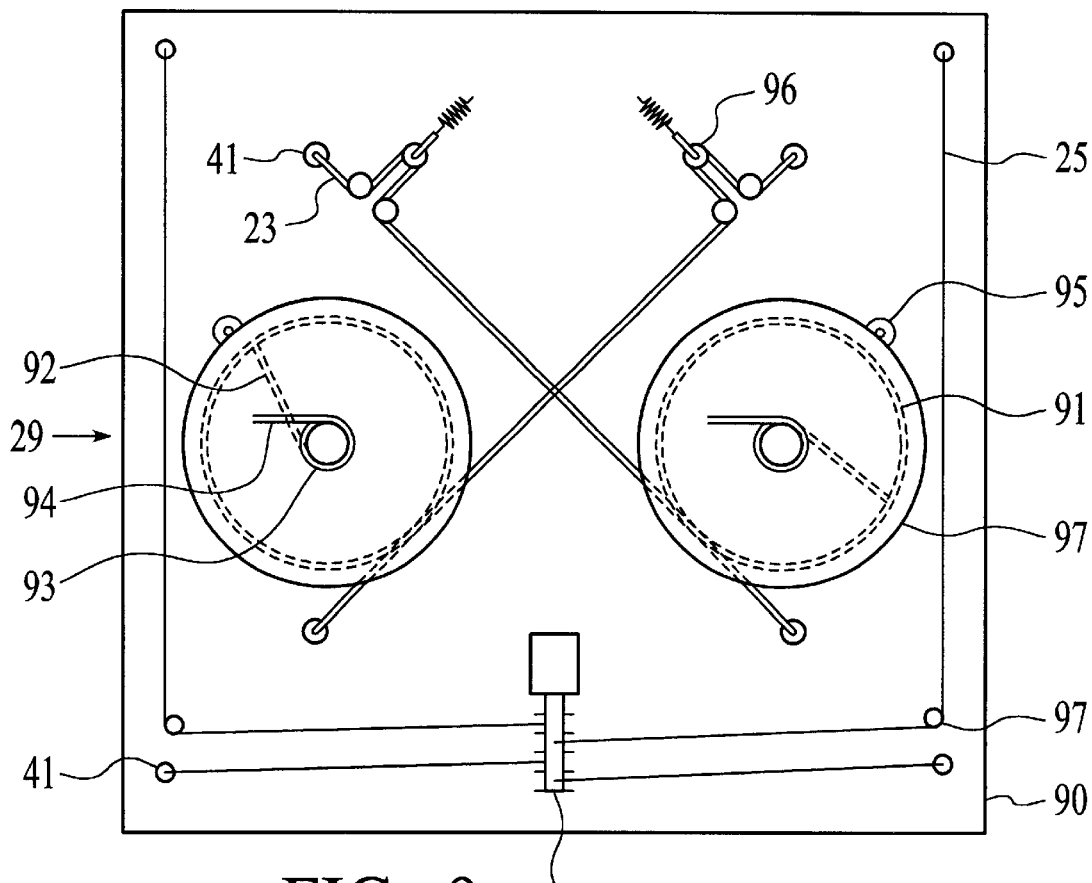
FIG. 9 illustrates a top view with details of a preferred embodiment of a cable management winching system
Figure 10:
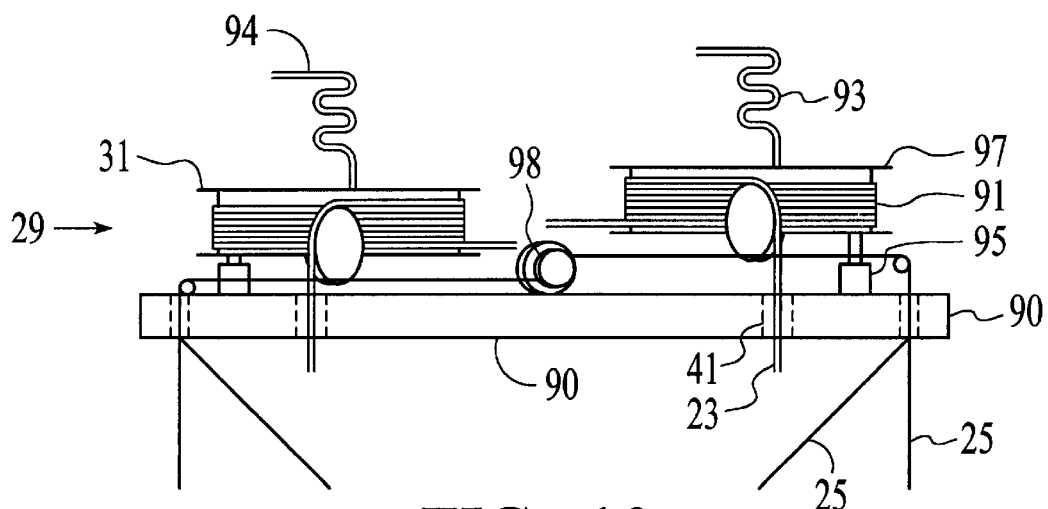
FIG. 10 illustrates a side view of the cable management winching system of FIG. 9.

FIG. 9 shows a top view of a preferred embodiment of the cable management winching system 29. FIG. 10 shows the corresponding side view. A baseplate structure 90 acts as a frame to support the components of the system. Tilt cables 23 are guided through the baseplate structure 90 by smooth low-friction collars 41. The tilt cables 23 are wrapped around a bullwheel 97 forming a helical portion 91, wherein a bullwheel is a cylinder having a rope or cable wound about it for lifting items. The tilt cables 23 for opposite corners are formed as a single cable. The midpoint along the length of this combined cable is rigidly attached to a point on the bullwheel 97. Two additional wraps each way around the bullwheel 97 are sufficient to ensure that this midpoint of the tilt cable 23 will never leave the bullwheel 97. An electrically conducting wire 92 connected to the midpoint of the tilt cable 23 rotates as a unit with the bullwheel 97. The electrically conducting wire 92 is connected to a flexible coil of electrically conducting cable 93. The flexible coil 93 transfers power to a fixed cable 94 attached to the structure (not shown). The portion 93 is long enough that it can twist and untwist as the bullwheel 97 rotates back and forth. This arrangement permits the tilt cables 23 to conduct electrical power from the solar panels 21 to the fixed portion of the gondola 11 without recourse to slip rings. A tip driving motor 95 turns the bullwheel 97. A generic tensioning device 96 takes up slack in the tilt cables 23 over extremes of motion.

The orientation of the various arrangements disclosed herein may be controlled using relatively simple control devices. For example, the system may receive information regarding the position of a target, such as the sun, via sensors, global positioning systems, or other readily available sources of target information. With this information the system drives the motor and tilt cables to acquire the desired orientation with respect to the target. Knowledge of the position and orientation of each object and the position and orientation of the target readily permits conversion into desired tilt cable positions. The system disclosed herein raises or lowers the required tilt cables to move one point of each object or solar panel to orient the object or panel arrangement toward the target. The use of only two sets of tilt cables in the rectangular solar panel array arrangement provides the ability to control the orientation of the solar array panels into reasonable orientations. Maximum and minimum desired orientations must be maintained.

Deployment/retraction cables 25 pass through the baseplate 90 via low-friction guide holes 41 in a fashion similar to that described above for the tilt cables 23. Pulleys 97, or equivalent, guide the deployment/retraction cables 25 to a winch 98. One could incorporate constant tension clutches in the sheaves of the pulleys to compensate for slight differences in lengths of the deployment/retraction cables 25. Such an arrangement would ensure that the restowed stack of solar panels 15 will be snug and equally tensioned.

Figure 11:
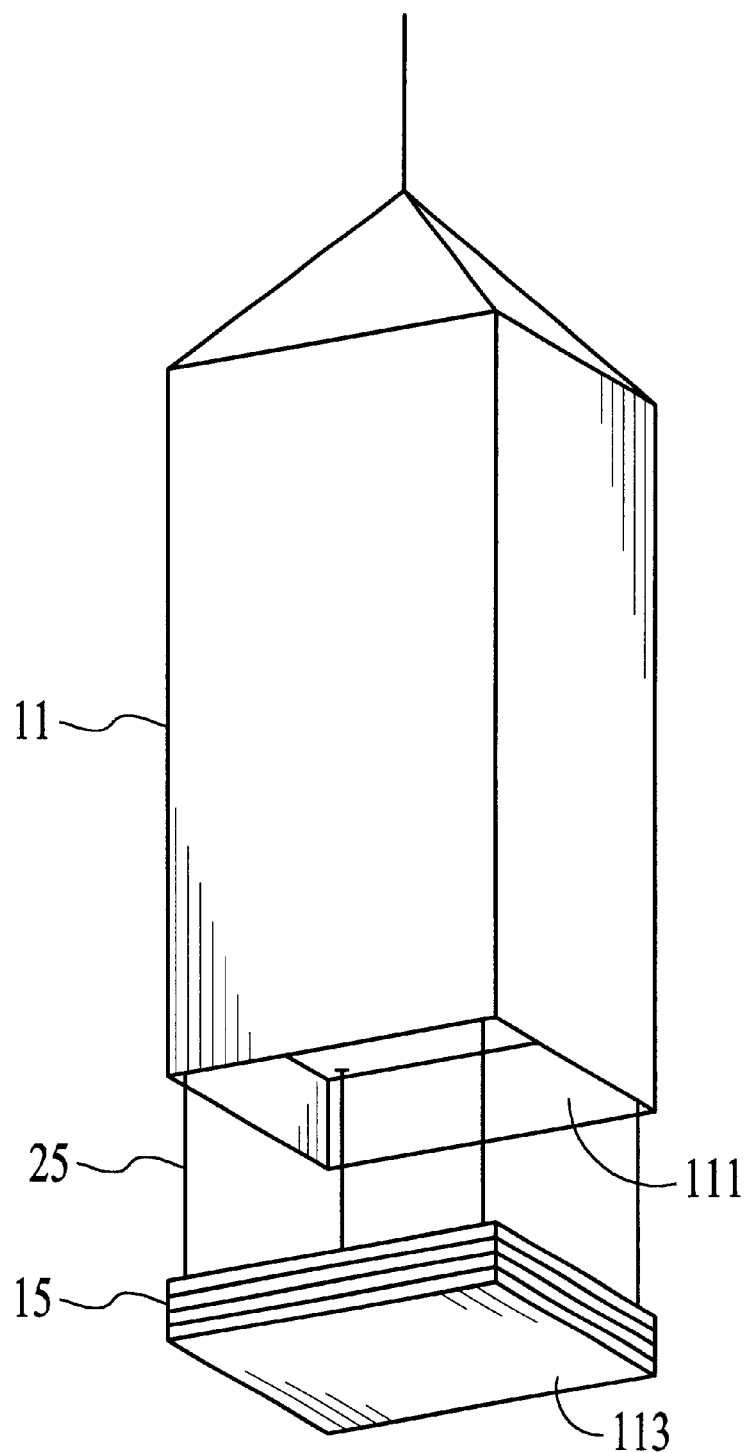
FIG. 11 illustrates a perspective view from below as a stack of panels is about to be fully retracted into a protective housing in the bottom of a balloon system gondola.

FIG. 11 shows a perspective view of a third embodiment including a protective open enclosure 111 surrounding the base of the gondola 11 to help capture the stack 15 and protect it. The bottom panel 113 of the stack 15 may be made of more rugged material so that it can provide additional support at the bottom of the gondola 11. This will help protect the stack 15 of solar panels from damage during landing as the gondola 11 returns to earth, possibly with a parachute used to slow the decent.

Figure 12:
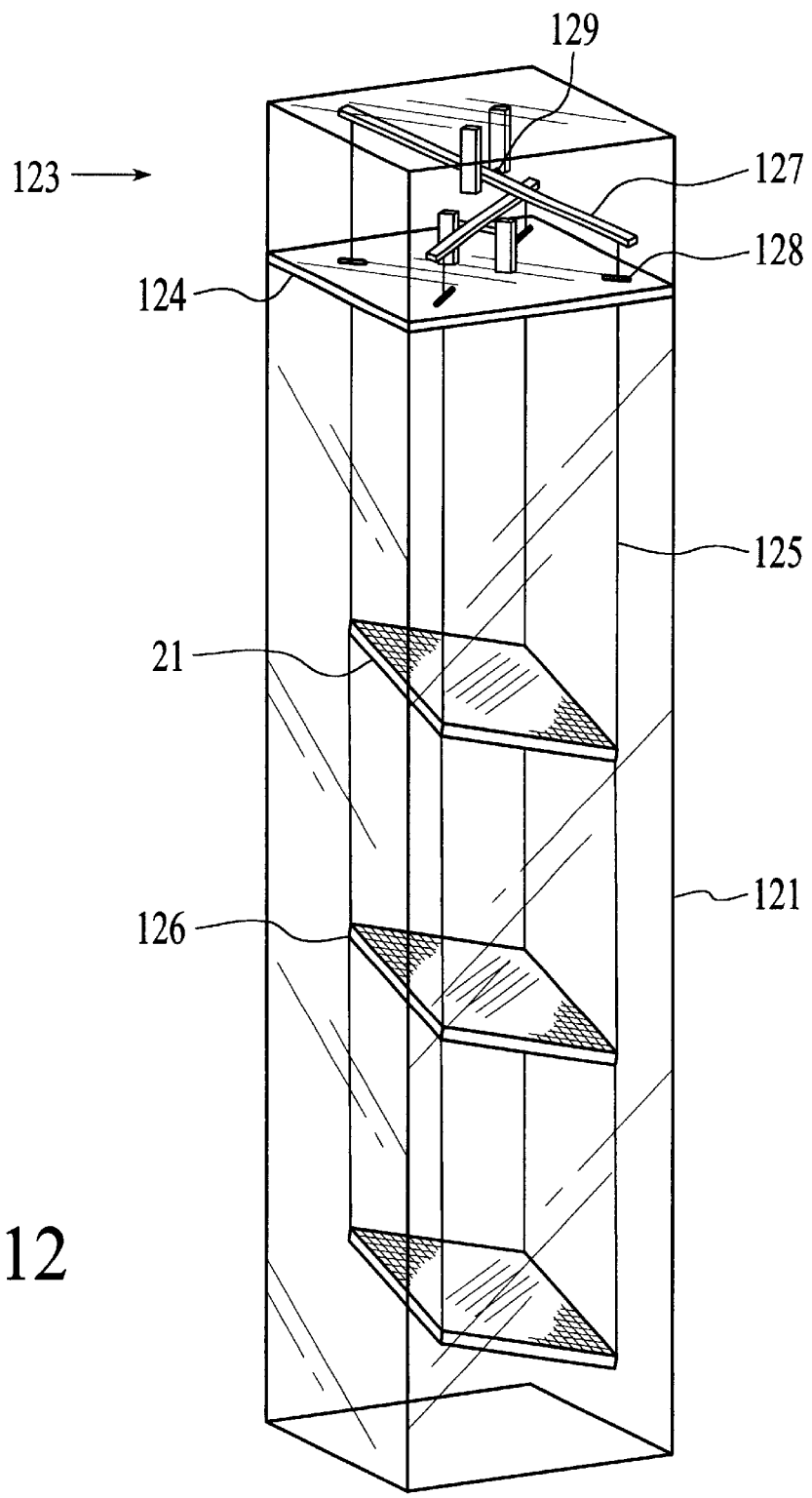
FIG. 12 illustrates in perspective an embodiment in which a stack of solar panels inside a transparent enclosure can be oriented by tilt cables.

FIG. 12 shows a fourth embodiment in which deploying and restowing are not necessary. An arrangement of solar panels 21 is shown suspended inside a transparent structure 121 that could be on top of a building or freestanding on the ground. For this situation, it is not necessary to include the cables to deploy or to restow the panels. In addition, the tilt cables 23 of previous embodiments can be replaced by more general possibly rigid links 125 which are attached to the panels 21 at attachment points 126. The winching assembly 27 of previous embodiments can be replaced by a more general articulation system 123 mounted at the top of the structure. A box-like frame 124 supports the components of the system. Instead of the bullwheels 97 used to control the tilt cables 23 of the cable management winching system 29 of FIG. 9, a pair of tilt arms 127 mounted on pivots 129 operated by motors (not shown) are used to adjust the positions of the links 125. Four clearance slots 128 replace the guide holes 41 of FIG. 9 to allow movement of the closest links 125 through the base of the articulation system 123.

The assembly of solar panels could alternatively be arranged in other configurations. For example, the solar panel array arrangement disclosed herein could be suspended in a large glassed entry area of an office building. In addition to providing some power, it could act as a slowly moving piece of art.

Figure 13:
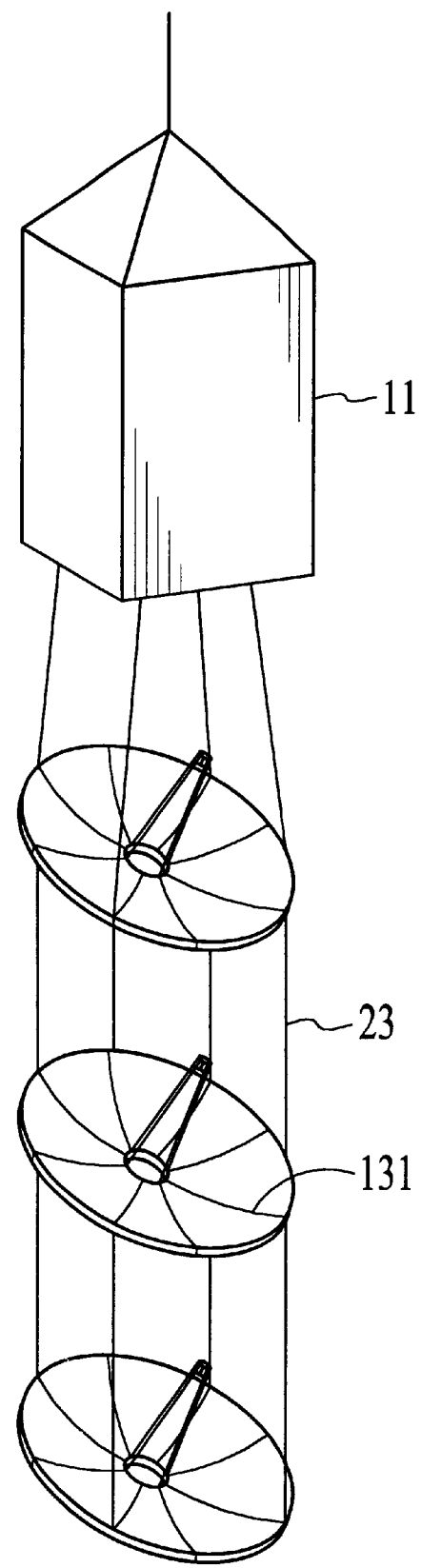
FIG. 13 illustrates in perspective an embodiment in which a series of antenna dishes can be suspended and oriented in parallel fashion below a balloon gondola.

FIG. 13 shows a perspective view of a fifth embodiment in which the two degree of freedom tilt mechanism is used to aim radio antenna dishes 131 towards a common distant target. The assembly is shown suspended beneath the balloon gondola 11. Only tilt cables 23 are shown for clarity. Deployment/retraction cables 25 could optionally be added to this arrangement.

Figure 14:
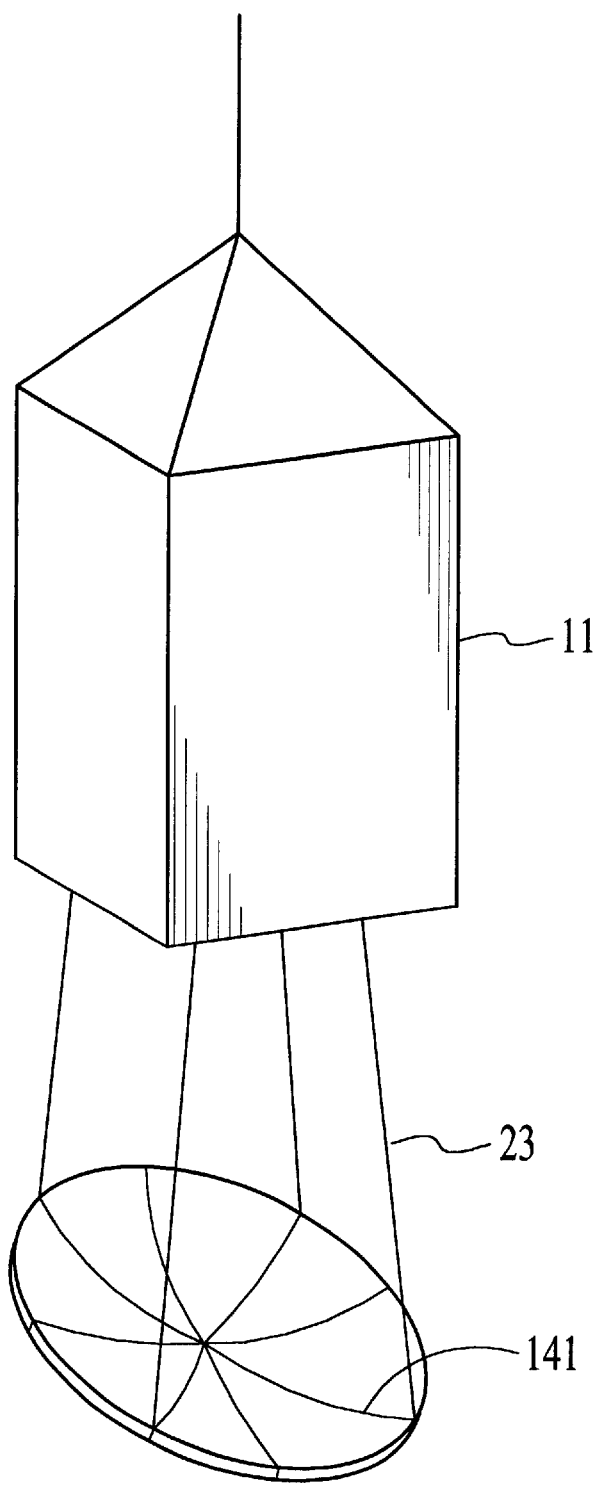
FIG. 14 illustrates in perspective a curved solar reflector concentrator suspended and oriented by cables below a balloon system gondola.

FIG. 14 shows a perspective view of a sixth embodiment with a large solar reflector dish 141 suspended below the balloon gondola 11 by tilt cables 23. The dish 141 could be used to reflect sunlight toward a solar panel mounted in a fixed position on the bottom of the gondola. The reflector dish 141 need not be very precisely formed, but could, for example, be made of a thin mylar or polyethylene film coated with a reflective material such as aluminum. A light duty self-deploying spring hoop similar to those used in automobile sunshades could be used to stretch out the film. This arrangement could be lighter and less costly since fewer solar cells would be needed to generate the same amount of power. Furthermore, some of the extra heat could be used to maintain the temperature of the gondola.

Figure 15:
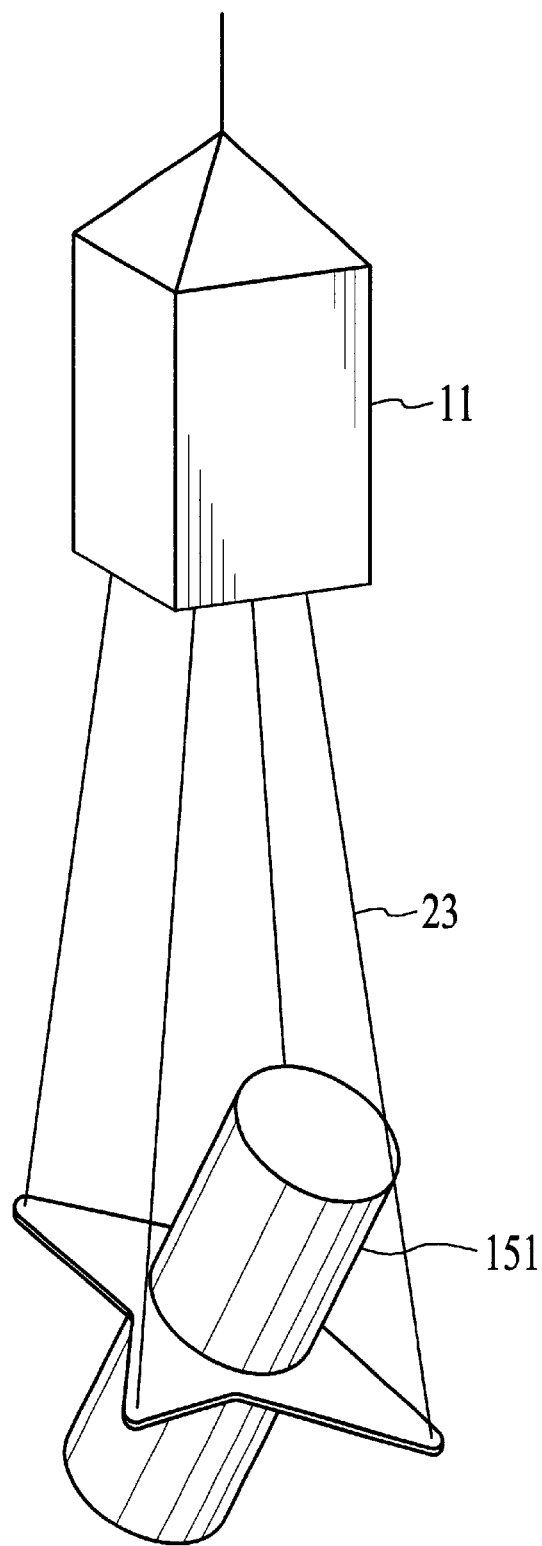
FIG. 15 illustrates another embodiment of the suspended tip/tilt mechanism aiming a telescope.
Figure 16:
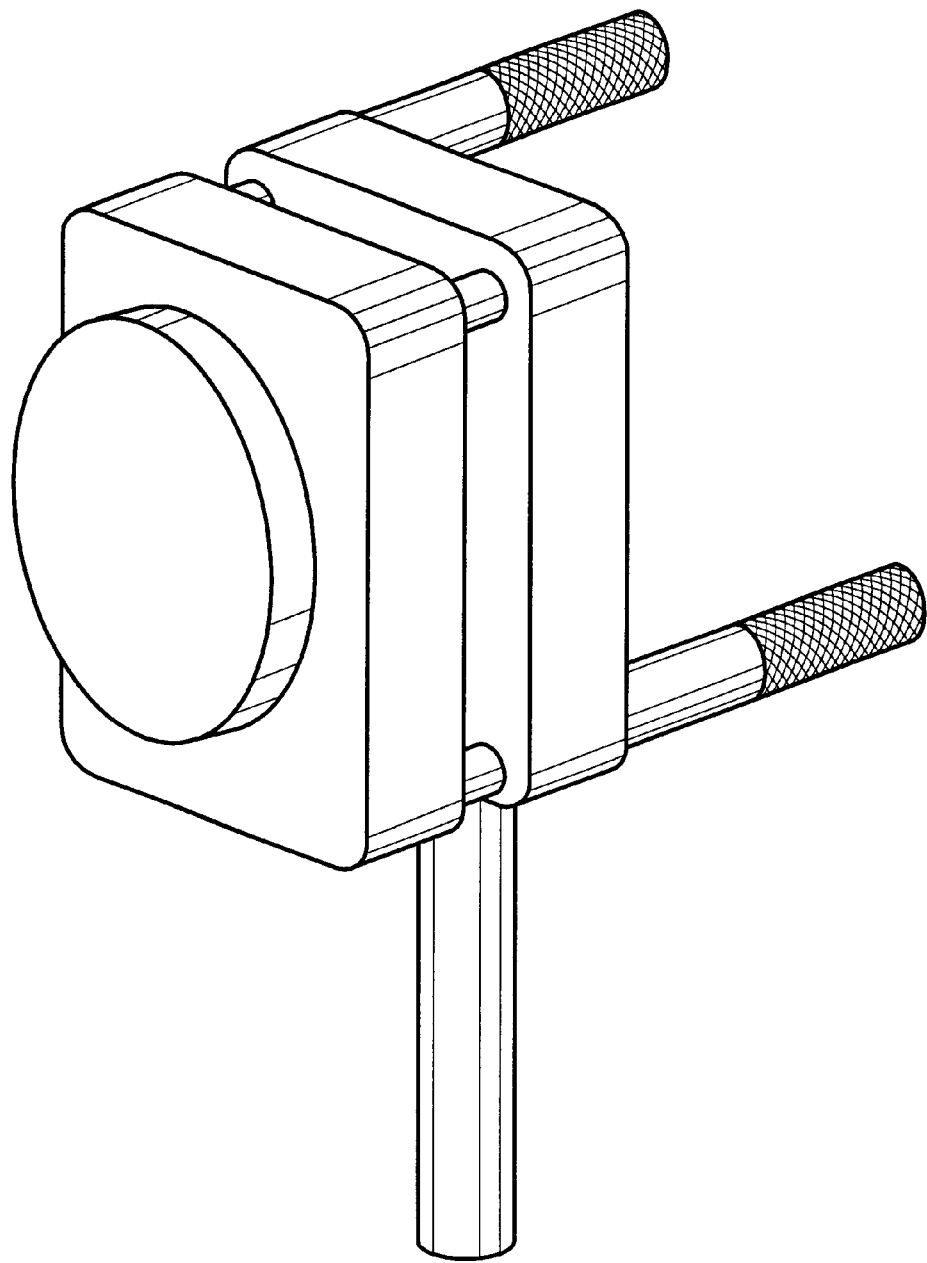
FIG. 16 illustrates a prior art mirror mount which converts two linear degrees of freedom into two tilt degrees of freedom.

FIG. 15 shows a perspective view of a seventh embodiment in which a telescope 151 or other instrument is suspended by tilt cables 23 below a balloon gondola 11. For some orientations, the tilt cables 23 may be in front of the aperture. This usually will not interfere with the operation of a telescope since the cable is in the near field and well out of focus. If the instrument is a downward looking device, then clearly the cables 23 will not interfere with the field of view of the instrument.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An orienting system, comprising:
    a frame;
    at least one object to be oriented; and
    a plurality of tilt cables for changing the orientation of each object, wherein the tilt cables provide a connection between said at least one object and the frame and the tilt cables operate to change the orientation of each object in two rotational degrees of freedom.

2. An orienting system according to claim 1, further comprising:
    a winching system for operating the tilt cables to change the orientation of each object.

3. An orienting system according to claim 2, further comprising: a plurality of deployment/retraction cables for changing distances that interconnect said at least one object and distances between each object and the frame.

4. An orienting system according to claim 3, further comprising: a second winching system for operating the deployment/retraction cables to change the distances that interconnect said at least one object and distances between each object and the frame.

5. An orienting system according to claim 4, further comprising: a protective structure to enclose said at least one object in a stowed configuration.

6. An orienting system according to claim 1, wherein said at least one object includes a solar panel.

7. An orienting system according to claim 6, further comprising: an electrically conducting wire connected to the solar panel and a winching system.

8. An orienting system according to claim 7, wherein the winching system includes a bullwheel and an electrically conducting flexible coil, the flexible coil is connected to the bullwheel, and the flexible coil transfers solar power from the electrically conducting wire to a fixed cable adapted to receive power.

9. An orienting system according to claim 1, wherein said at least one object includes an optical instrument.

10. An orienting system according to claim 1, wherein said at least one object includes an antenna.

11. An orienting system according to claim 1, wherein said at least one object includes a reflector.

12. An orienting system according to claim 1, wherein said at least one object comprises a plurality of objects and said objects have a substantially uniform orientation.

13. An orienting system, comprising:
    a frame;
    at least one object to be oriented; and a plurality of links for changing the orientation of each object; wherein the links interconnect said at least one object to the frame and change the orientation of each object in two rotational degrees of freedom.

14. An orienting system according to claim 13, further comprising: an articulation system for operating the links to change the orientation of each object.

15. An orienting system according to claim 14, wherein said at least one object includes a solar panel.

16. An orienting system according to claim 15, further comprising: an electrically conducting wire connected to the solar panel and the articulation system.

17. An orienting system according to claim 13, further comprising: a substantially transparent structure to enclose said at least one object.

18. A method for orienting at least one object toward a target, comprising the steps of:

deploying each object using at least one deployment/retraction element, said deployment/retraction element connecting each object to a frame; and tilting each object by repositioning at least one tilt element attached to each object, thereby positioning each object in a favorable orientation with respect to the target.

19. The method of claim 18, wherein each deployment/retraction element comprises a deployment/retraction cable and each tilt element comprises a tilt cable.

20. The method of claim 18, wherein said at least one tilt element changes the orientation of each object in two rotational degrees of freedom.

21. The method of claim 18, wherein each tilt element passes through an opening in said each object.

22. A system for orienting an object in a predetermined direction, comprising:

means for supporting the object throughout a range of orientations; and means for adjusting the orientation of the object in two rotational degrees of freedom.

23. The system of claim 22, further comprising:

means for deploying and retracting the object from a stowed configuration.

24. The system of claim 22, wherein the object comprises a solar panel.

25. A system for orienting a plurality of objects in a predetermined direction, comprising:

means for supporting the objects throughout a range of orientations; and means for adjusting the orientations of the objects in two rotational degrees of freedom, wherein the orientations of the objects are substantially uniform.

26. The system of claim 23, further comprising:

means for deploying and retracting the objects from a stowed configuration.

27. The system of claim 25, wherein the objects comprise a solar panel.

28. An orienting system, comprising:

a frame;

at least one object to be oriented, said at least one object including a solar panel; and a plurality of tilt cables for determining the orientation of each object, wherein the tilt cables provide a connection between said at least one object and the frame.

29. An orienting system according to claim 28, further comprising:

a winching system for operating the tilt cables to change the orientation of each object.

30. An orienting system according to claim 29, further comprising: a plurality of deployment/retraction cables for changing distances that interconnect said at least one object and distances between each object and the frame.

31. An orienting system according to claim 30, further comprising: a second winching system for operating the deployment/retraction cables to change the distances that interconnect said at least one object and distances between each object and the frame.

32. An orienting system according to claim 31, further comprising: a protective structure to enclose said at least one object in a stowed configuration.

33. An orienting system according to claim 28, further comprising: an electrically conducting wire connected to the solar panel and a winching system.

34. An orienting system according to claim 33, wherein the winching system includes a bullwheel and an electrically conducting flexible coil, the flexible coil is connected to the bullwheel, and the flexible coil transfers solar power from the electrically conducting wire to a fixed cable adapted to receive power.

35. An orienting system according to claim 28, wherein said at least one object includes a second solar panel, and the solar panel and the second solar panel have a substantially uniform orientation.

* * * * *